US011962078B2

(12) United States Patent
Tsai

(10) Patent No.: US 11,962,078 B2
(45) Date of Patent: Apr. 16, 2024

(54) PHASE MODULATED ANTENNA WITH A LIQUID CRYSTAL LAYER

(71) Applicant: InnoLux Corporation, Miao-Li County (TW)

(72) Inventor: Tsung-Han Tsai, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 744 days.

(21) Appl. No.: 17/144,380

(22) Filed: Jan. 8, 2021

(65) Prior Publication Data

US 2021/0242579 A1 Aug. 5, 2021

(30) Foreign Application Priority Data

Feb. 5, 2020 (CN) ......................... 202010080357.0

(51) Int. Cl.
*H01Q 1/36* (2006.01)
*H01Q 1/52* (2006.01)
*H01Q 3/44* (2006.01)
*H01Q 21/06* (2006.01)

(52) U.S. Cl.
CPC ............. *H01Q 1/364* (2013.01); *H01Q 1/526* (2013.01); *H01Q 3/44* (2013.01); *H01Q 21/061* (2013.01); *H01Q 21/065* (2013.01)

(58) Field of Classification Search
CPC . H01Q 1/364; H01Q 3/34; H01Q 3/44; H01P 1/181; H01P 1/184
See application file for complete search history.

(56) References Cited

U.S. PATENT DOCUMENTS

| | | | | |
|---|---|---|---|---|
| 11,233,320 B2 * | 1/2022 | Lu | H01Q 3/44 |
| 11,309,616 B2 * | 4/2022 | Lu | G02F 1/1313 |
| 2014/0266897 A1 * | 9/2014 | Jakoby | H01Q 3/44 29/601 |
| 2015/0109178 A1 * | 4/2015 | Hyde | H01Q 13/28 343/772 |
| 2015/0236415 A1 * | 8/2015 | Bily | H01Q 21/0012 342/372 |
| 2016/0261043 A1 * | 9/2016 | Sazegar | H01Q 3/24 |
| 2018/0159213 A1 * | 6/2018 | Haziza | H01Q 1/38 |
| 2019/0013571 A1 * | 1/2019 | Hsu | H01Q 15/0066 |
| 2020/0059005 A1 * | 2/2020 | Wu | H01Q 9/0435 |
| 2020/0243969 A1 * | 7/2020 | Fang | H01Q 3/36 |
| 2020/0266553 A1 * | 8/2020 | Cao | H01Q 21/065 |
| 2020/0343634 A1 * | 10/2020 | Wang | H01P 5/12 |
| 2021/0005979 A1 * | 1/2021 | Chiu | H01Q 3/44 |
| 2021/0021023 A1 * | 1/2021 | Lee | H03C 7/02 |
| 2021/0080765 A1 * | 3/2021 | Hu | H01P 1/184 |
| 2021/0083351 A1 * | 3/2021 | Tsai | H01P 1/184 |

(Continued)

FOREIGN PATENT DOCUMENTS

CN 110233315 A * 9/2019 ................ H01P 1/18

*Primary Examiner* — Ab Salam Alkassim, Jr.
(74) *Attorney, Agent, or Firm* — McClure, Qualey & Rodack, LLP

(57) ABSTRACT

An electronic device includes a plurality of antenna units and a circuit. At least one of the antenna units includes a first electrode, a phase modulation electrode, and a liquid crystal layer located between the first electrode and the phase-shift electrode. The circuit provides a first AC signal directly to the phase modulation electrode, and it provides a second AC signal indirectly to the phase-shift electrode.

20 Claims, 11 Drawing Sheets

(56) References Cited

U.S. PATENT DOCUMENTS

| | | | | |
|---|---|---|---|---|
| 2021/0135374 | A1* | 5/2021 | Tsai | H01Q 1/38 |
| 2021/0151900 | A1* | 5/2021 | Haziza | H01Q 3/44 |
| 2022/0131264 | A1* | 4/2022 | Jia | H01Q 1/48 |
| 2023/0006356 | A1* | 1/2023 | Yoon | H01Q 9/065 |
| 2023/0163481 | A1* | 5/2023 | Jia | H01Q 1/48<br>343/893 |
| 2023/0387562 | A1* | 11/2023 | Tsai | G02F 1/1337 |

* cited by examiner

PHASE MODULATED ANTENNA WITH A LIQUID CRYSTAL LAYER

CROSS REFERENCE TO RELATED APPLICATIONS

This Application claims priority of China Patent Application No. 202010080357.0, filed on Feb. 5, 2020, the entirety of which is incorporated by reference herein.

BACKGROUND

Field of the Invention

The present disclosure relates to an electronic device, and in particular to an antenna device.

Description of the Related Art

Electronic products have become an indispensable necessity in modern society. With the vigorous development of such electronic products, consumers have high expectations for the quality, function or price of these products.

Some electronic products are further equipped with communication capabilities, such as an antenna device, but the performance or reliability of the antenna device still needs to be improved so that it can operate stably in different environments for a long duration, for example.

SUMMARY

The disclosure provides an electronic device that includes a plurality of antenna units and a circuit. At least one of the plurality of antenna units includes a first electrode, a phase-shift electrode, and a liquid crystal layer located between the first electrode and the phase-shift electrode. The circuit provides a first alternating current (AC) signal directly to the phase-shift electrode, and it provides a second AC signal indirectly to the phase-shift electrode.

According to the disclosed electronic device, the residual direct current (DC) voltage in the antenna device can be reduced, and the performance or stability of the antenna device can be improved.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE INVENTION

Figure 1:
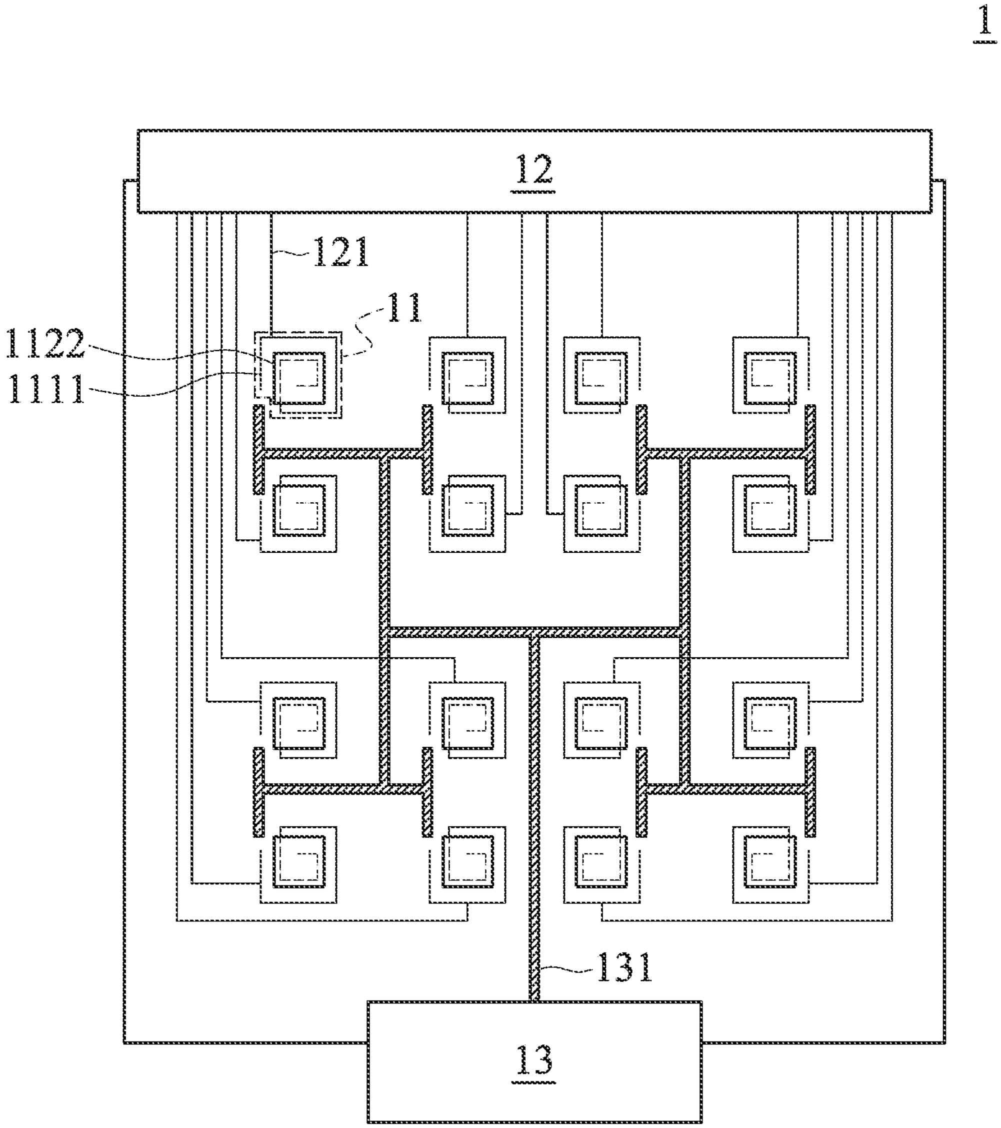
FIG. 1 is a top view of the architecture of an antenna device according to Embodiment 1 of the present disclosure.

The following description provides many different embodiments, or examples, for implementing different features of the disclosure. Elements and arrangements described in the specific examples below are merely used for the purpose of concisely describing the present disclosure and are merely examples, which are not intended to limit the present disclosure. For example, a description of a structure wherein a first feature is on or above a second feature may refer to cases where the first feature and the second feature are in direct contact with each other, or it may refer to cases where there is another feature disposed between the first feature and the second feature, such that the first feature and the second feature are not in direct contact.

The terms "first" and "second" of this specification are used only for the purpose of clear explanation and are not intended to limit the scope of the patent. In addition, terms such as "the first feature" and "the second feature" are not limited to the same or different features.

Spatial terms, such as upper or lower, are used herein merely to describe the relationship of one element or feature to another element or feature in the drawings. In addition to the directions provided in the drawings, there are devices that may be used or operated in different directions.

In the specification, the terms "about" and "approximately" usually mean within 10%, within 5%, within 3%, within 2%, within 1%, or within 0.5% of a given value or range. The quantity given here is an approximate quantity, and the meaning of "approximate" and "approximately" can still be implied without specifying "approximate" or "approximately". In addition, the term "range is between the first value and the second value" means that the range includes the first value, the second value, and other values between them.

The shapes, dimensions, and thicknesses in the drawings may not be scaled or be simplified for clarity of illustration, and are provided for illustrative purposes only. According to some embodiments of the present disclosure, the provided electronic device may be an antenna device, a liquid crystal display device, a sensing device, a light emitting device, a splicing device, other suitable devices, or a combination of the above devices, but it is not limited thereto. The electronic device may be a bendable or flexible electronic device. The antenna device may be, for example, a liquid crystal antenna, but it is not limited thereto. The splicing device may be, for example, an antenna splicing device, but it is not limited thereto. It should be understood that the electronic device may be any arrangement and combination described above, but the disclosure is not limited thereto. The following embodiments may use antenna devices for exemplary illustration of the electronic devices of the present disclosure, but it is not limited thereto.

Figure 2:
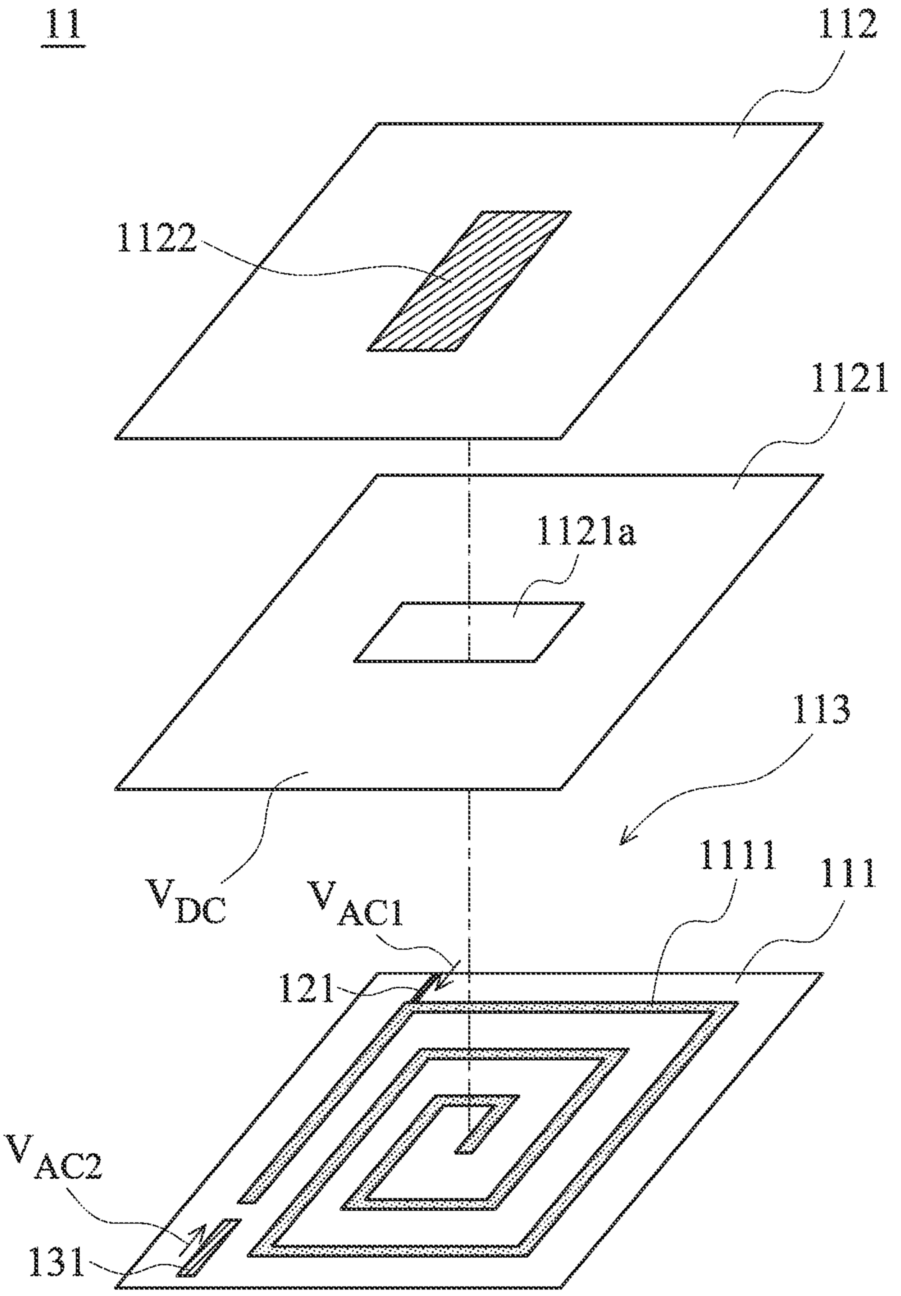
FIG. 2 is a perspective view of an antenna unit in the antenna device of FIG. 1.

Please refer to FIG. 1 and FIG. 2. FIG. 1 is a top view of the architecture of an antenna device 1 according to Embodiment 1 of the present disclosure. The antenna device 1 may include a plurality of antenna elements 11 and a circuit. The circuit may include a phase modulation circuit 12 and a wireless signal feeding circuit 13. The phase modulation circuit 12 may be connected to at least one of the plurality of antenna units 11 through a wire 121 to provide an electrical signal to the at least one of the antenna units 11, such as a phase modulation voltage $V_{AC1}$. In one embodiment, the phase modulation voltage $V_{AC1}$ received by one antenna unit 11 can be independent of the phase modulation voltage $V_{AC1}$ received by another antenna unit 11. The phase modulation voltage $V_{AC1}$ may be an AC voltage. The frequency of the modulation voltage $V_{AC1}$ may be ranged between 1 Hz and 1000 Hz (1 Hz≤$V_{AC1}$≤1000 Hz), such as 50 Hz, 100 Hz, 200 Hz, 500 Hz, or 800 Hz, but is not limited thereto. The wireless signal feeding circuit 13 can extend to be adjacent to an antenna unit 11 through the wire 131 but not directly connected to each of the antenna units 11, thereby feeding an electric signal, such as an AC voltage $V_{AC2}$. The frequency of the AC voltage $V_{AC2}$ may be ranged between 1 MHz and 1000 THz ($10^6$ Hz≤$V_{AC2}$≤$10^{15}$ Hz), such as $10^7$ Hz, $10^8$ Hz, $10^9$ Hz, $10^{11}$ Hz, $10^{12}$ Hz, $10^{13}$ Hz, or $10^{14}$ Hz, but is not limited thereto. In other words, the frequency of the phase modulation voltage $V_{AC1}$ may be less than the frequency of the AC voltage $V_{AC2}$ ($V_{AC1}$<$V_{AC2}$). In the present disclosure, the electrical signal may include voltage and/or current, such as DC voltage, AC voltage, DC current, and/or AC current, but is not limited thereto. FIG. 2 is a perspective view of an antenna unit 11 in the antenna device 1 of FIG. 1. As shown in FIG. 2, the antenna unit 11 may include a first substrate 111, a second substrate 112 and a liquid crystal layer 113. The first substrate 111 and the second substrate 112 are opposite to each other, and the liquid crystal layer 113 is located between the first substrate 111 and the second substrate 112. In an embodiment, the first substrate 111 and the second substrate 112 may include glass substrates or other suitable substrates, but not limited thereto. The liquid crystal layer 113 may be filled with liquid crystal having high birefringence, but it is not limited thereto.

The antenna unit 11 may further include a phase modulation electrode 1111, a common electrode 1121, and a radiation electrode pad 1122. The phase modulation electrode 1111 may be disposed between the first substrate 111 and the common electrode 1121. The common electrode 1121 may be disposed between the second substrate 112 and the phase modulation electrode 1111. The second substrate 112 may be disposed between the radiation electrode pad 1122 and the liquid crystal layer 113, but is not limited thereto. For example, the phase modulation electrode 1111 can be disposed on the first substrate 111. The liquid crystal layer 113 may be disposed on the phase modulation electrode 1111. The common electrode 1121 can be disposed on the liquid crystal layer 113. The second substrate 112 may be disposed on the common electrode 1121. The radiation electrode pad 1122 may be disposed on the second substrate 112. In other embodiments, the radiation electrode pad 1122 may be disposed between the second substrate 112 and the common electrode 1121. The radiation electrode pad 1122 may overlap at least part of the phase modulation electrode 1111, but is not limited thereto. In one embodiment, one end of the phase modulation electrode 1111 can face the wire 131 without contact, and the AC voltage $V_{AC2}$ output from the wireless signal feeding circuit 13 can be provided to the phase modulation electrode 1111 through electromagnetic coupling, to generate radio frequency or millimeter wave wireless signals. The phase modulation electrode 1111 can be further directly connected to the wire 121, thereby receiving the AC voltage $V_{AC1}$ provided by the phase modulation circuit 12. In some embodiments, the corner of the phase modulation electrode 1111 may not be directly connected to the wire 121, but is not limited thereto. The dielectric constant of the liquid crystal layer 113 can be modulated by a voltage difference between the phase modulation voltage $V_{AC1}$ of the phase modulation electrode 1111 and the common voltage $V_{DC}$ of the common electrode 1121. The common electrode 1121 may include a hollowed feeding area 1121*a* therein. The radiation electrode pad 1122 may partially overlap the feeding area 1121*a* in the normal direction of the substrate (e.g. the first substrate 111 or the second substrate 112), thereby allowing wireless signals to be emitted through the radiation electrode pad 1122 through the feeding area 1121*a*.

In Embodiment 1 of the present disclosure, the phase modulation voltage $V_{AC1}$ is AC voltage, so that the voltage across the liquid crystal layer 113 will alternately switch its polarity. In this way, it is possible to reduce the accumulation of charged impurities in the liquid crystal layer 113 on one of the first substrate 111 and the second substrate 112 which damages the emission quality of the antenna device 1, thereby improving the performance or reliability of the antenna.

Figure 3A:
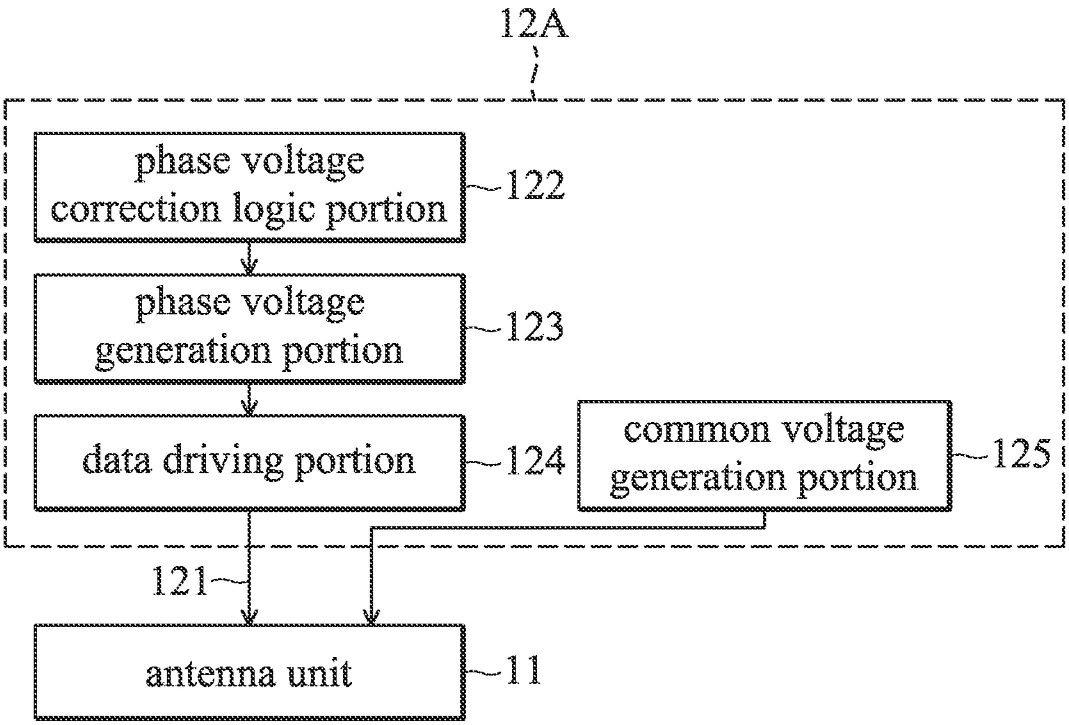
FIG. 3A shows an example of the architecture of a phase modulation circuit of the present disclosure.

Next, the configuration of the phase modulation circuit 12 will be described. When the antenna device 1 is passive driving, the configuration of the phase modulation circuit 12 may be, for example, the phase modulation circuit 12A shown in FIG. 3A. The phase modulation circuit 12A may include a phase voltage correction logic portion 122, a phase voltage generation portion 123, a data driving portion 124, and a common voltage generation portion 125. The phase voltage correction logic portion 122 can have a built-in curve of the relationship between the voltage and the dielectric constant of the liquid crystal layer 113. Therefore, the voltage value that should be output is selected according to a required phase. The phase voltage generating portion 123 may generate a voltage according to the voltage value selected by the phase voltage correction logic portion 122. In the present disclosure, the voltage may be an AC voltage signal. The data driving portion 124 can use the AC voltage generated by the phase voltage generating portion 123 as the phase modulation voltage $V_{AC1}$ within a given time, and output the phase modulation voltage $V_{AC1}$ to the phase modulation electrode 1111 of the antenna unit 11 through the wire 121. The common voltage generating portion 125 can provide a common voltage $V_{DC}$ to the common electrode 1121, and the liquid crystal layer 113 in the antenna unit 11 generates a specific cross voltage to provide a specific dielectric constant.

Figure 3B:
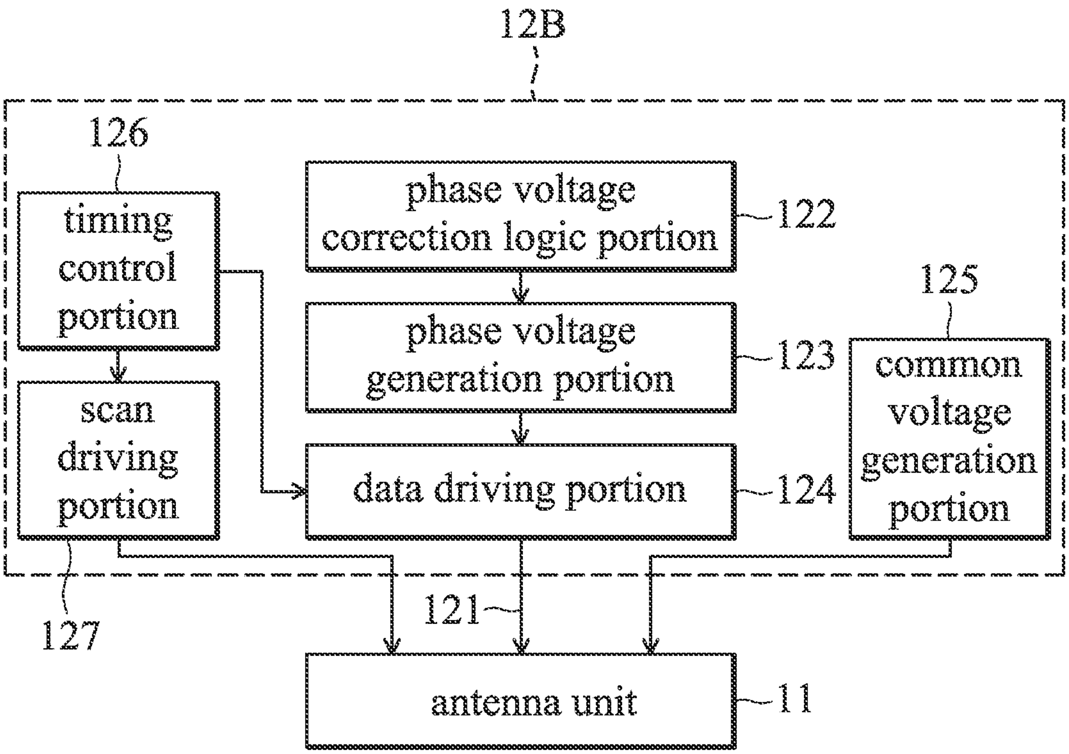
FIG. 3B shows an example of the architecture of a phase modulation circuit of the present disclosure.

When the antenna device 1 is active driving, the antenna unit 11 may further include an active element, such as a thin film transistor, but not limited thereto. When the active element is scanned and turned on, the phase modulation voltage $V_{AC1}$ can be input to the antenna unit 11. In this case, the configuration of the phase modulation circuit 12 may be, for example, the phase modulation circuit 12B shown in FIG. 3B. The phase modulation circuit 12B may include a phase voltage correction logic portion 122, a phase voltage generation portion 123, a data drive portion 124, a common voltage generation portion 125, a timing control portion 126, and a scan driving portion 127. The phase voltage correction logic portion 122, the phase voltage generation portion 123, the data driving portion 124, and the common voltage generation portion 125 may be similar to or the same as those in FIG. 3A, and the description will not be repeated hereinafter. The timing control unit 126 can control scan timing of active elements and output timing of the phase modulation voltage $V_{AC1}$, and the scan driving portion 127 can output scan signals to turn on the active elements according to given time points, and the data driving unit 124 can output the phase modulation voltage $V_{AC1}$ to the phase modulation electrode 1111 at given time points.

Figure 4:
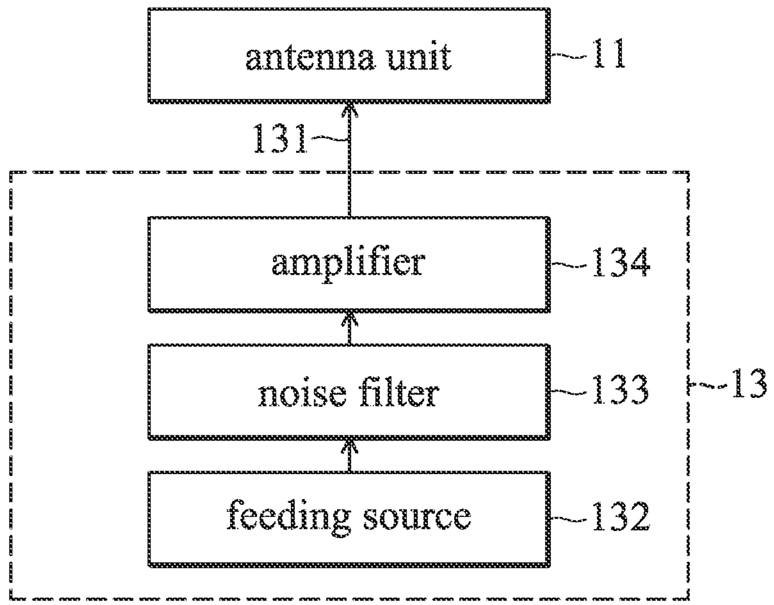
FIG. 4 shows an example of the architecture of a wireless signal feeding circuit of the present disclosure.

The configuration of the wireless signal feeding circuit 13 will be described below. The configuration of the wireless signal feeding circuit 13 can be as shown in FIG. 4. The wireless signal feeding circuit 13 may include a feeding source 132, a noise filter 133, and an amplifier 134. The feeding source 132 may be a voltage-controlled oscillator, which generates an AC voltage signal in a certain frequency range by controlling the oscillation frequency. The noise filter 133 can filter out the noise in the output signal from the feeding source 132 and output the filtered output signal to the amplifier 134. The amplifier 134 can amplify the signal as AC voltage $V_{AC2}$ and feed it into the antenna unit 11 through the wire 131 in an indirect manner. In this disclosure, "indirect" may refer to indirect contact between two objects, but is not limited to this.

Figure 5:
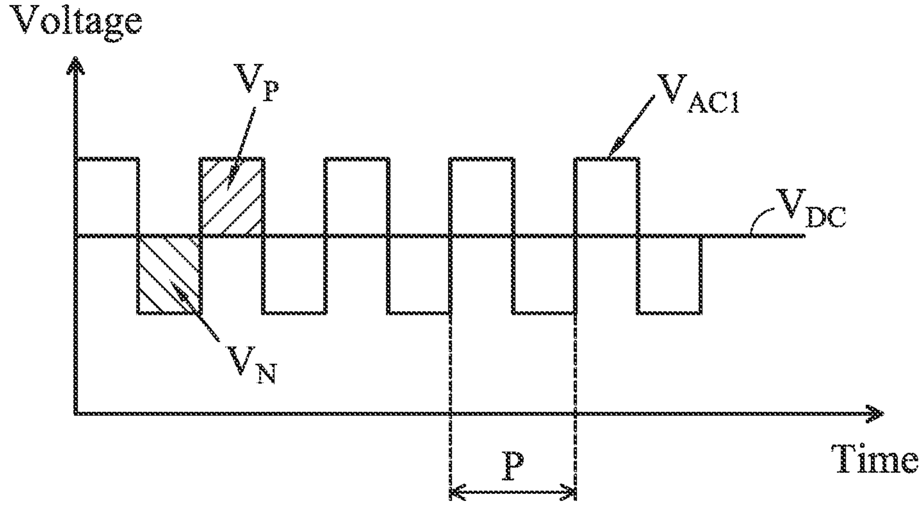
FIG. 5 is a waveform of phase modulation voltage and common voltage versus time.

FIG. 5 is used to illustrate the relationship between the phase modulation voltage $V_{AC1}$ and the common voltage $V_{DC}$. In the present disclosure, the phase modulation voltage $V_{AC1}$ is designed to oscillate back and forth across the common voltage $V_{DC}$. The phase modulation voltage $V_{AC1}$ may be a periodic wave with a period P. Suppose that the part where the phase modulation voltage $V_{AC1}$ is greater than the voltage $V_{DC}$ is defined as a positive voltage part $V_P$ of the phase modulation voltage $V_{AC1}$, and the part where the phase modulation voltage $V_{AC1}$ is less than the voltage $V_{DC}$ is defined as a negative voltage part $V_N$ of the phase modulation voltage $V_{AC1}$. In the present disclosure, in one period, the integral of the time of the positive voltage part $V_P$ to its amplitude is 80% to 125% of the integral of the time of the negative voltage part $V_N$ to its amplitude (80%≤the integral of the time of the positive voltage part $V_P$ to its amplitude/the integral of the time of the negative voltage part $V_N$ to its amplitude≤125%), for example, 90%, 100%, 110%, or 120%. That is, in FIG. 5, the area of the positive voltage part $V_P$ may be 80% to 125% of the area of the negative voltage part $V_N$, for example, 90%, 100%, 110%, or 120%. In this way, the values of the positive cross voltage and the negative cross voltage can be maintained to be close to each other, the liquid crystal layer 113 can be driven by appropriate AC voltage, and the accumulation of impurities in the liquid crystal layer 113 is reduced.

In addition, the disclosure does not limit the range of the phase modulation voltage $V_{AC1}$. The phase modulation voltage $V_{AC1}$ may be designed between 1V and 100V ($1V \leq V_{AC1} \leq 100V$), such as 5V, 10V, 30V, or 50V, but not limited thereto. In one embodiment, when the preset phase modulation voltage $V_{AC1}$ and the common voltage $V_{DC}$ deviate from the designed specifications, the common voltage $V_{DC}$ may also be adjusted appropriately.

Figure 6:
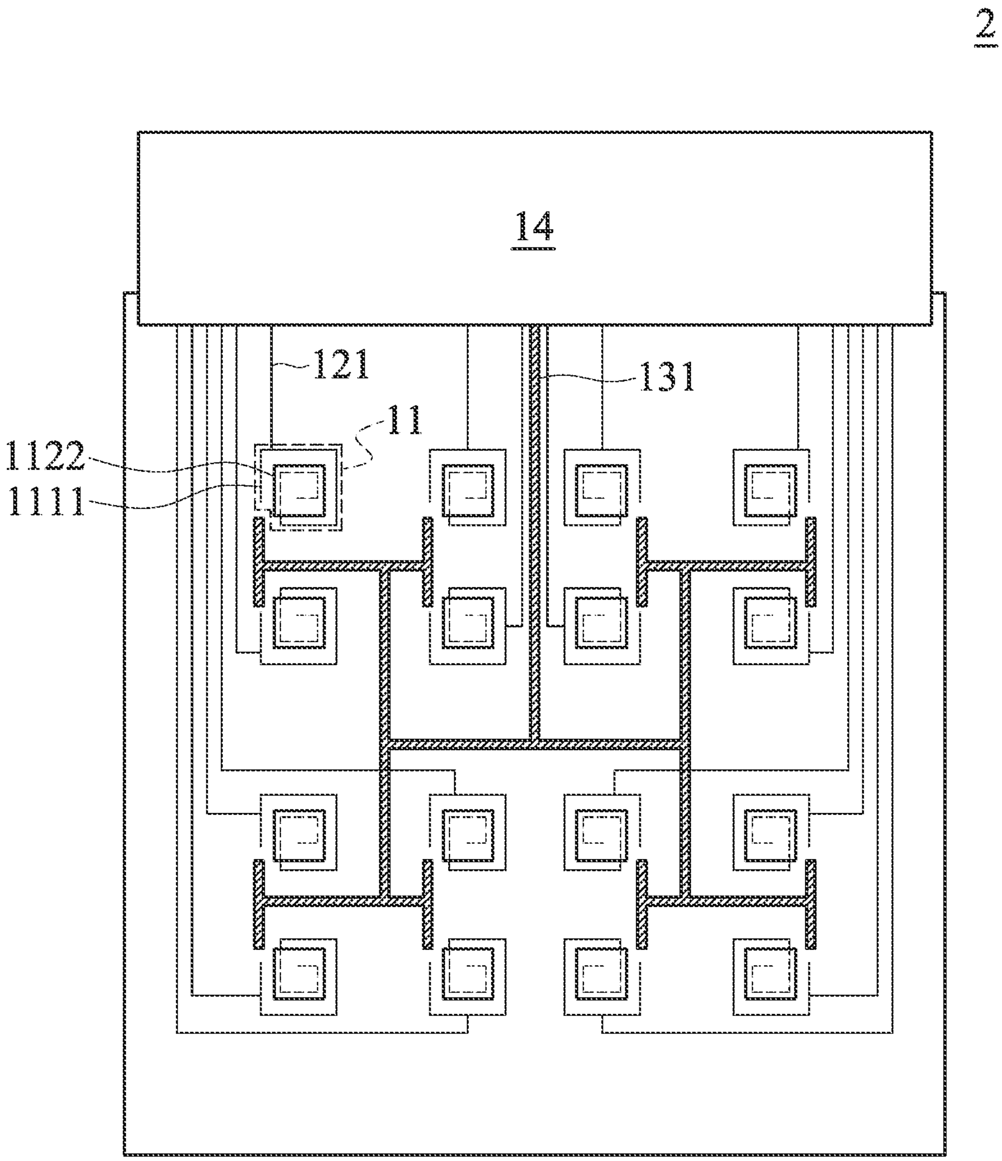
FIG. 6 is a top view of the architecture of an antenna device according to Embodiment 2 of the present disclosure.

Next, Embodiment 2 of the present disclosure will be described. FIG. 6 is a top view of the architecture of an antenna device according to Embodiment 2 of the present disclosure. The difference between the antenna device 2 of Embodiment 2 and the antenna device 1 of Embodiment 1 is that the antenna device 1 of Embodiment 1 has a phase modulation circuit 12 and a wireless signal feeding circuit 13, and the antenna device 2 of Embodiment 2 has an integrated signal control circuit 14 that integrates the phase modulation circuit 12 and the wireless signal feeding circuit 13. The integrated signal control circuit 14 can also provide an independent AC phase modulation voltage $V_{AC1}$ to the at least one antenna unit 11 through the wire 121, and can feed an AC wireless signal to at least one of the antenna units 11 through the wire 131. Since the integrated signal control circuit 14 of Embodiment 2 may be equivalent to the combination of the phase modulation circuit 12 and the wireless signal feeding circuit 13 of Embodiment 1, the other structures or the operation mode of the antenna device 2 of Embodiment 2 are similar to or the same as those of the antenna device 1 of Embodiment 1. The antenna device 2 of Embodiment 2 can also reduce the accumulation of charged impurities on a specific substrate (e.g. the first substrate 111 or the second substrate 112) by receiving an AC phase modulation voltage $V_{AC1}$, thereby improving the antenna performance or reliability.

Figure 7:
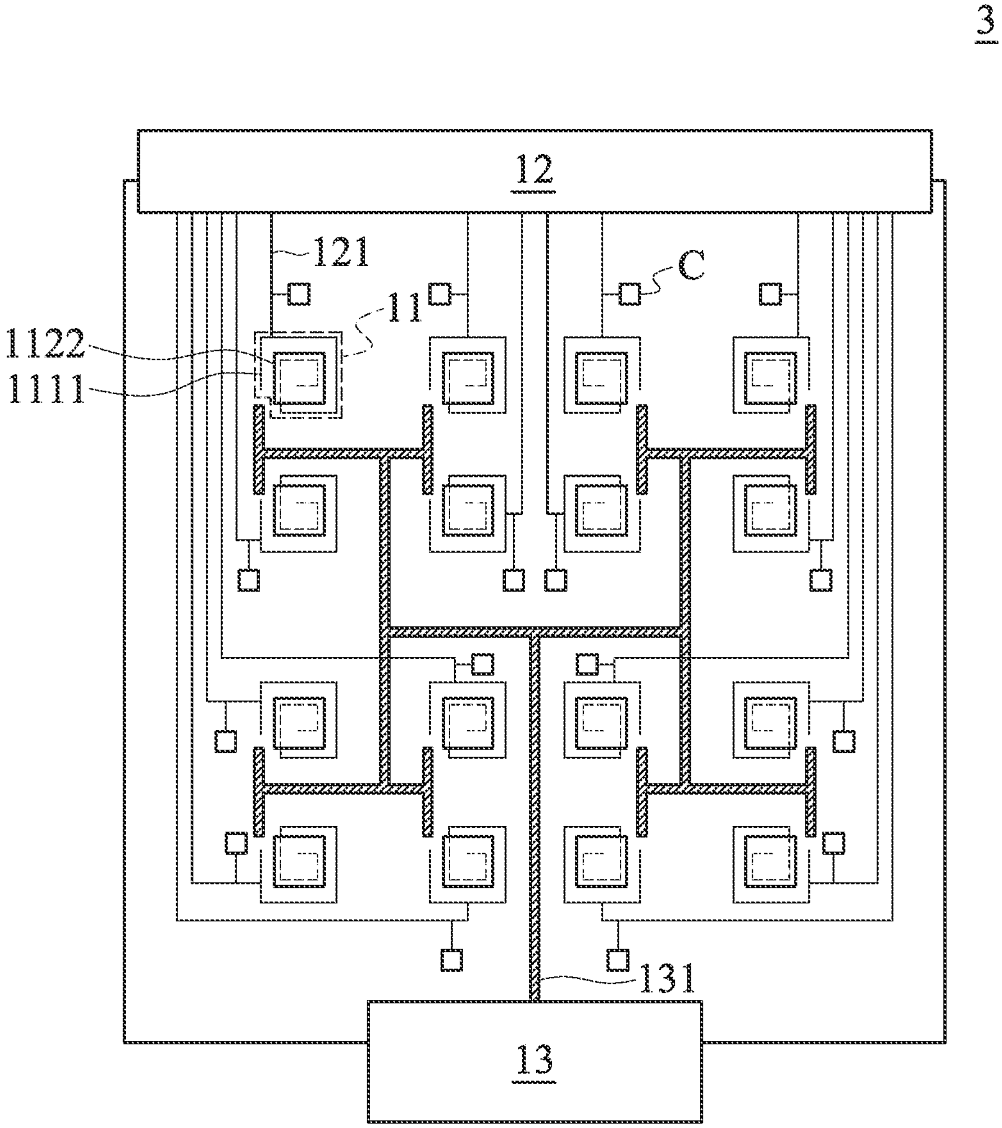
FIG. 7 is a top view of the architecture of an antenna device according to Embodiment 3 of the present disclosure.

Next, Embodiment 3 of the present disclosure will be described. FIG. 7 is a top view of the architecture of an antenna device 3 of the present disclosure. The antenna device 3 of Embodiment 3 is different from the antenna device 1 of Embodiment 1 in that the antenna device 3 of Embodiment 3 is provided with a capacitor C for at least one of the antenna units 11. The capacitor C may be coupled to the wire 121 transmitting the phase modulation voltage $V_{AC1}$. Thereby, the phase modulation voltage $V_{AC1}$ applied to the antenna unit 11 can be more stable, or the leakage current can be alleviated. Moreover, the other structures of the antenna device 3 of Embodiment 3 are the same as or similar to those of the antenna device 1 of Embodiment 1, and the antenna device 3 of Embodiment 3 can also receive the AC phase modulation voltage $V_{AC1}$ to reduce the accumulation of charged impurities on a specific substrate (e.g. the first substrate 111 or the second substrate 112), thereby improving the antenna performance or reliability.

Figure 8:
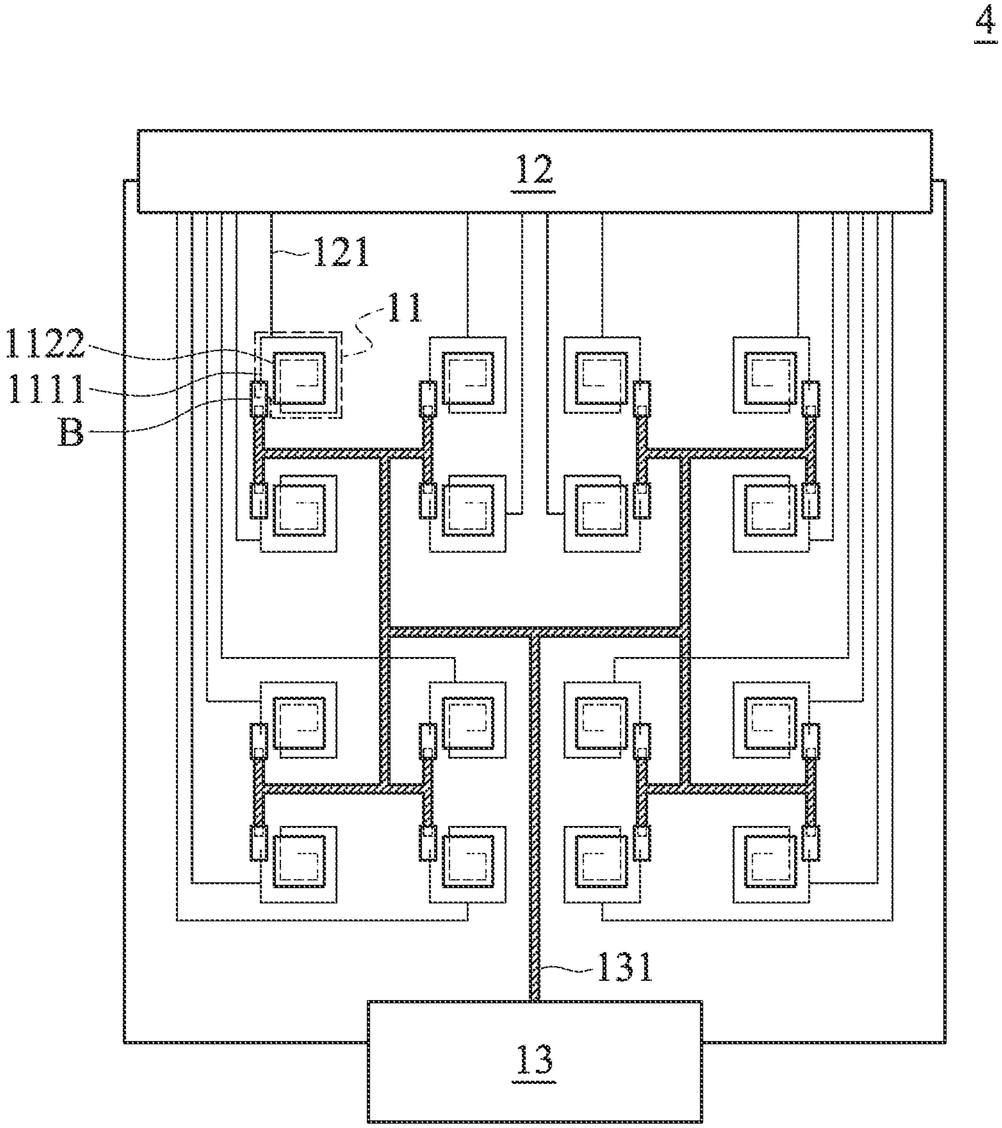
FIG. 8 is a top view of the architecture of an antenna device according to Embodiment 4 of the present disclosure.
Figure 9:
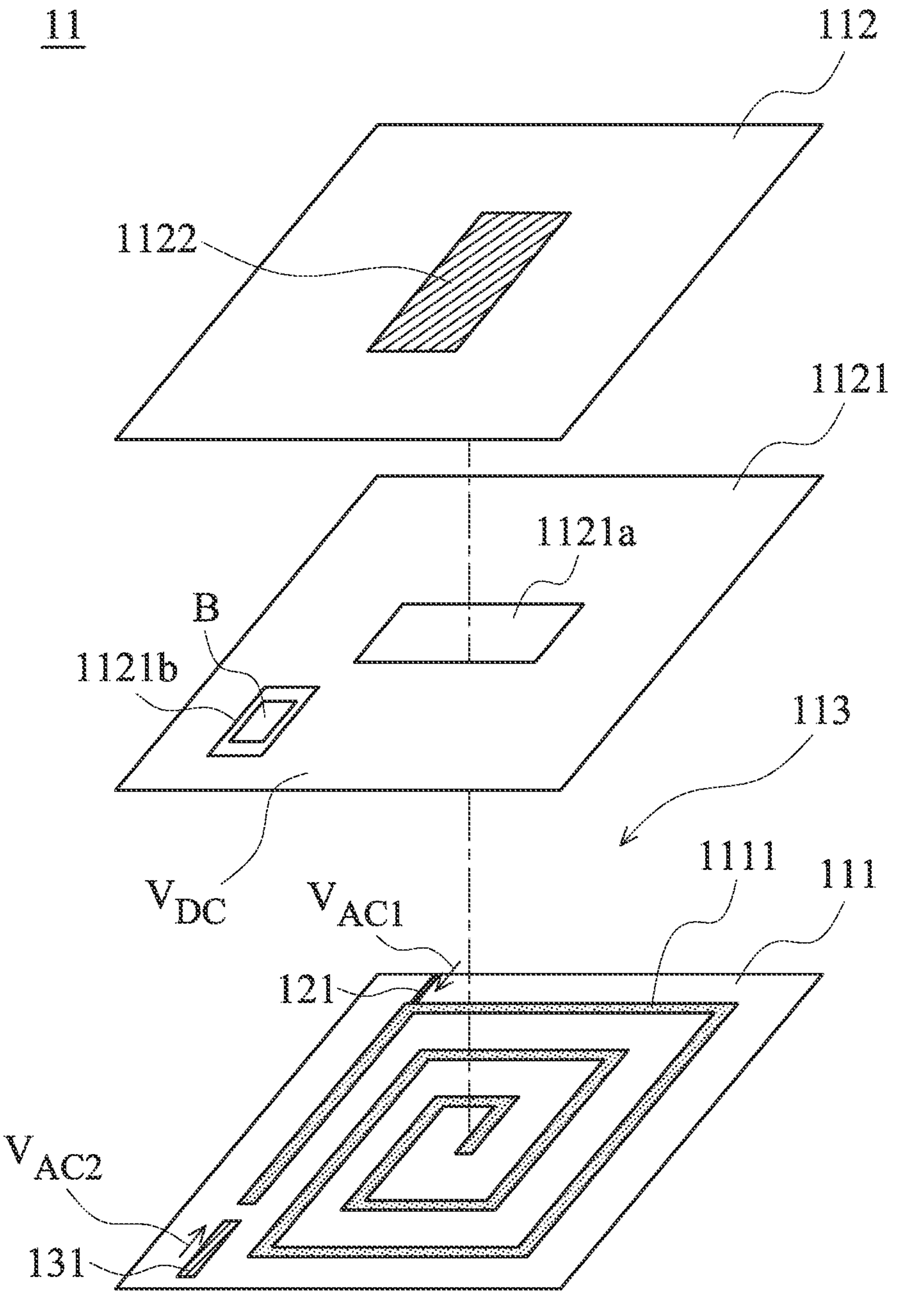
FIG. 9 is a perspective view of an antenna unit in the antenna device of FIG. 8.

Next, Embodiment 4 of the present disclosure will be described. FIG. 8 is a top view of the architecture of an antenna device 4 according to Embodiment 4 of the present disclosure. FIG. 9 is a perspective view of an antenna unit 11 in the antenna device 4 of FIG. 8. The antenna device 4 of Embodiment 4 is different from the antenna device 1 of Embodiment 1 in that the antenna device 4 of Embodiment 4 is provided with a shielding structure B for at least one of the antenna units 11. The shielding structure B may be a metal structure, a transparent conductive structure, or other conductive structures, the present disclosure is not limited thereto. As shown in FIG. 9, this shielding structure B can be correspondingly disposed on the position where the wire 131 is adjacent to an end of the phase modulation electrode 1111. The shielding structure B may be disposed in a hole 1121*b* in the common electrode 1121 and the shielding structure B may be not connected to the common electrode 1121. For example, the patterning process may be applied the common electrode 1121 to form the shielding structure B, that is, the common electrode 1121 and the shielding structure B may include the same material, such as a metal material, a transparent conductive material, other suitable materials, or a combination thereof, but it is not limited thereto. In another embodiment, the common electrode 1121 can be patterned to form the hole 1121*b*, and then a shielding structure B is formed in the hole 1121*b*. The hole 1121*b* and the shielding structure B may be located on a position where the ends of the wire 131 and the phase modulation electrode 1111 face each other. For example, the shielding structure B may overlap with the wire 131 (such as the end of the wire 131) and/or the phase modulation electrode 1111 (such as the end of the phase modulation electrode 1111) in the normal direction of the first substrate 111. The hole 1121*b* may overlap the wire 131 and/or the phase modulation electrode 1111 in the normal direction of the first substrate 111. Unless otherwise specified, the description “overlap” in this disclosure may include “entirely overlap” and “partially overlap”. Thereby, the high-frequency part of the AC voltage $V_{AC2}$ can be coupled to the phase modulation electrode 1111 through the shielding structure B, and the effect of the low-frequency part of the AC voltage $V_{AC2}$ on other antenna units 11 can be reduced by the shielding structure B. The mutual interference of low-frequency signals between the antenna devices 1 can be reduced, which can be equivalent to an effect of filtering. Moreover, the other structure of the antenna device 4 of Embodiment 4 is the same as or similar to that of the antenna device 1 of Embodiment 1, and the antenna device 4 of Embodiment 4 can also receive the AC phase modulation voltage $V_{AC1}$ to reduce the accumulation of charged impurities on a specific substrate (e.g. the first substrate 111 or the second substrate 112), and improve the antenna performance or reliability.

Figure 10:
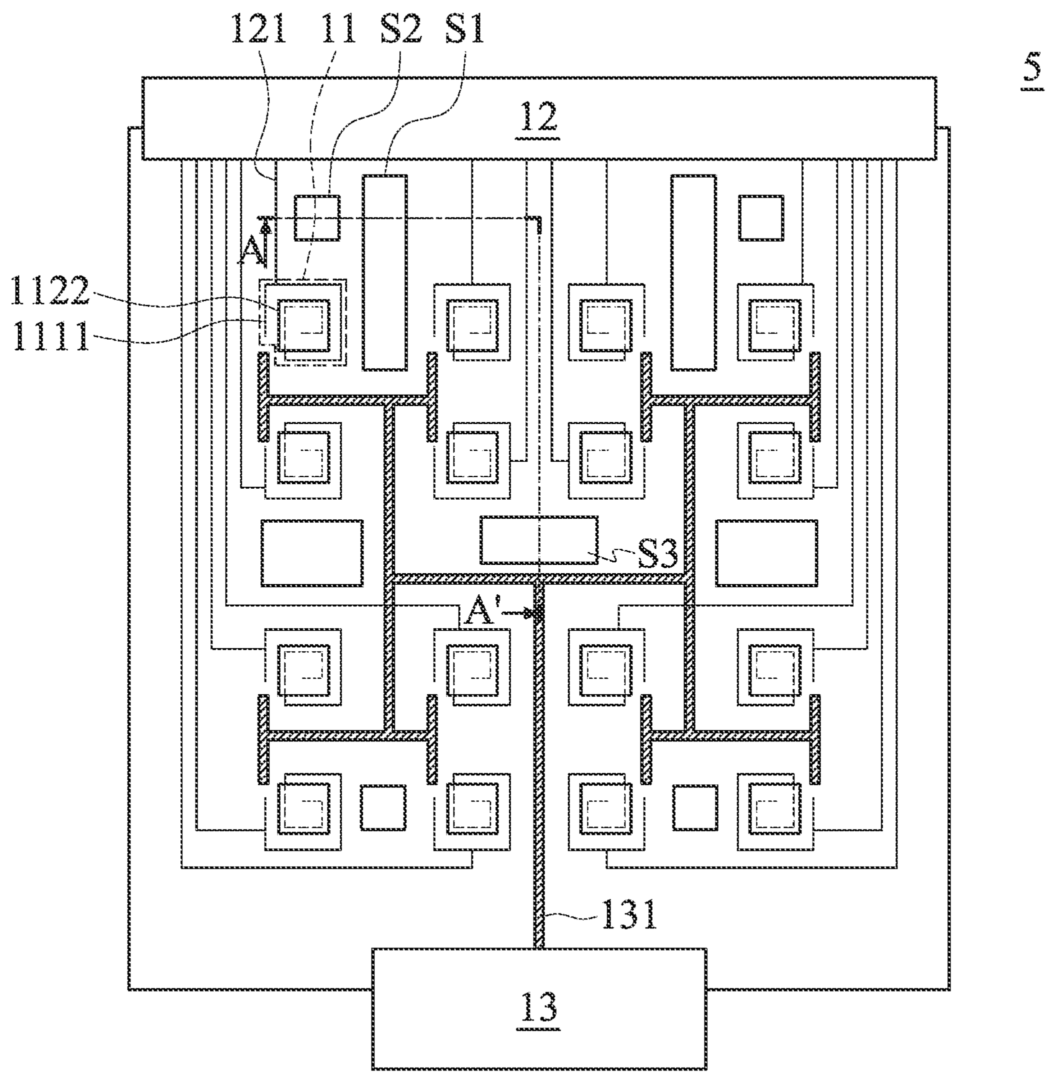
FIG. 10 is a top view of the architecture of an antenna device according to Embodiment 5 of the present disclosure.
Figure 11:
FIG. 11 is a cross-sectional view taken along line A-A' of FIG. 10.

Next, Embodiment 5 of the present disclosure will be described. FIG. 10 is a top view of the architecture of an antenna device 5 according to Embodiment 5 of the present disclosure. FIG. 11 is a cross-sectional view taken along line A-A' of FIG. 10. The antenna device 5 of Embodiment 5 is different from the antenna device 1 of Embodiment 1 in that the antenna device 5 of Embodiment 5 can be provided with a spacer S1, a spacer S2, and/or a spacer S3 in the liquid crystal layer 113 where the liquid crystal layer 113 does not overlap wires. The spacer S1, the spacer S2, and the spacer S3 may have various heights, for example, the spacer S1 may be in contact with the first substrate 111 and the second substrate 112, the spacer S2 may not be in contact with the second substrate 112, and the spacer S3 may be lower in height than the spacer S2. In the present disclosure, the description “contact” may include “direct contact” or “indirect contact.” In the present disclosure, the height of the spacer that does not contact both of the first substrate 111 and the second substrate 112 may be 50% to 95% of the thickness (e.g. the cell gap) of the liquid crystal layer 113 (e.g., 60%, 70%, or 80%), but not limited thereto. By providing spacers with various heights, it is beneficial to maintain the thickness of the liquid crystal layer 113 or reduce the influence caused by the variation of the thickness of the liquid crystal layer 113, thereby reducing the waveform variation of the phase modulation voltage $V_{AC1}$ and the AC voltage $V_{AC2}$ of the antenna unit 11, which may have a voltage stabilizing effect. Furthermore, the other structure of the antenna device 5 of Embodiment 5 is the same as or similar to that of the antenna device 1 of Embodiment 1, and the antenna device 5 of Embodiment 5 can also receive the AC phase modulation voltage $V_{AC1}$ to reduce the accumulation of charged impurities on a specific substrate (e.g. the first substrate 111 and the second substrate 112), and improve the antenna performance or reliability.

Figure 12:
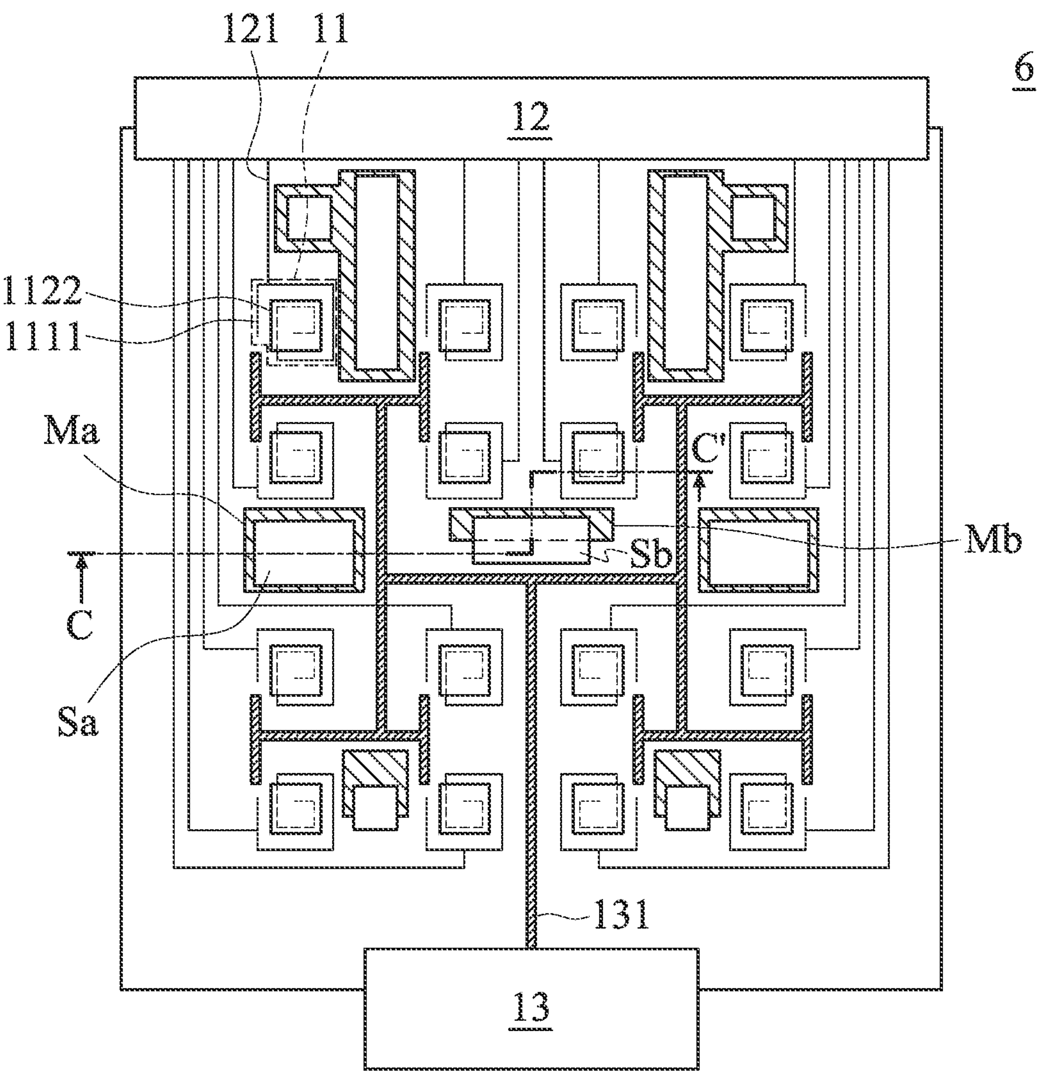
FIG. 12 is a top view of the architecture of an antenna device according to Embodiment 6 of the present disclosure.
Figure 13:
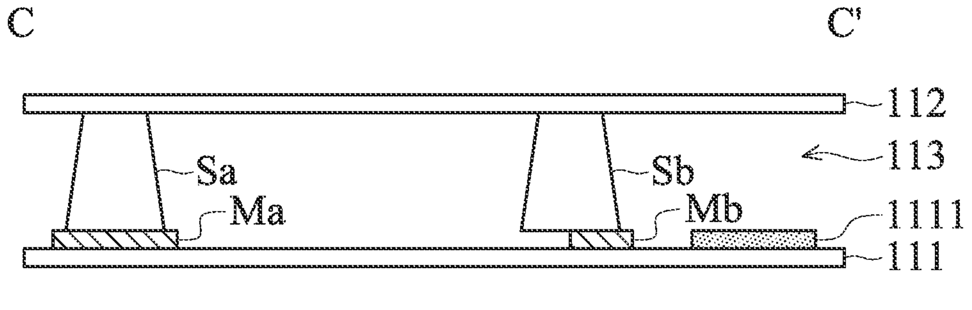
FIG. 13 is a cross-sectional view taken along line C-C' of FIG. 12.

Next, Embodiment 6 of the present disclosure will be described. FIG. 12 is a top view of the architecture of an antenna device 6 according to Embodiment 6 of the present disclosure. FIG. 13 is a cross-sectional view taken along line C-C' of FIG. 12, and for the sake of simplicity, FIG. 13 only shows the relationship between some elements and omits other elements. The antenna device 6 of Embodiment 6 is different from the antenna device 1 of Embodiment 1 in that the antenna device 6 of Embodiment 6 can be provided with a spacer Sa and/or a spacer Sb in the liquid crystal layer 113 where the liquid crystal layer 113 does not overlap wires, and a metal pad Ma may be sandwiched between or in indirect contact with the spacer Sa and the first substrate 111, and a metal pad Mb may be sandwiched between or in indirect contact with the spacer Sb and the first substrate 111. In the antenna device 6, the thickness of the metal pad Ma and the metal pad Mb may be substantially the same as the phase modulation electrode 1111, respectively. In one embodiment, the metal pad Ma and the metal pad Mb can also be formed with the phase modulation electrode 1111 in the same manufacturing process(es). By disposing the spacer Sa on the metal pad Ma having substantially the same thickness as the phase modulation electrode 1111, the thickness of the spacer Sa may be reduced. In one embodiment, a part of the spacer Sb may be disposed on the metal pad Mb, the other part is suspended outside the metal pad Mb and is not in contact with the first substrate 111. In this way, the metal pad Ma, the metal pad Mb, the spacer Sa, and the spacer Sb can fill the gap between the first substrate 111 and the second substrate 112, which can reduce the influence of the thickness variation of the liquid crystal layer 113. Moreover, the other structure of the antenna device 6 of Embodiment 6 is the same as or similar to that of the antenna device 1 of Embodiment 1, and the antenna device 6 of Embodiment 6 can also receive the AC phase modulation voltage $V_{AC1}$ to reduce the accumulation of charged impurities on a specific substrate (e.g. the first substrate 111 or the second substrate 112), and improve the antenna performance or reliability.

Figure 14:
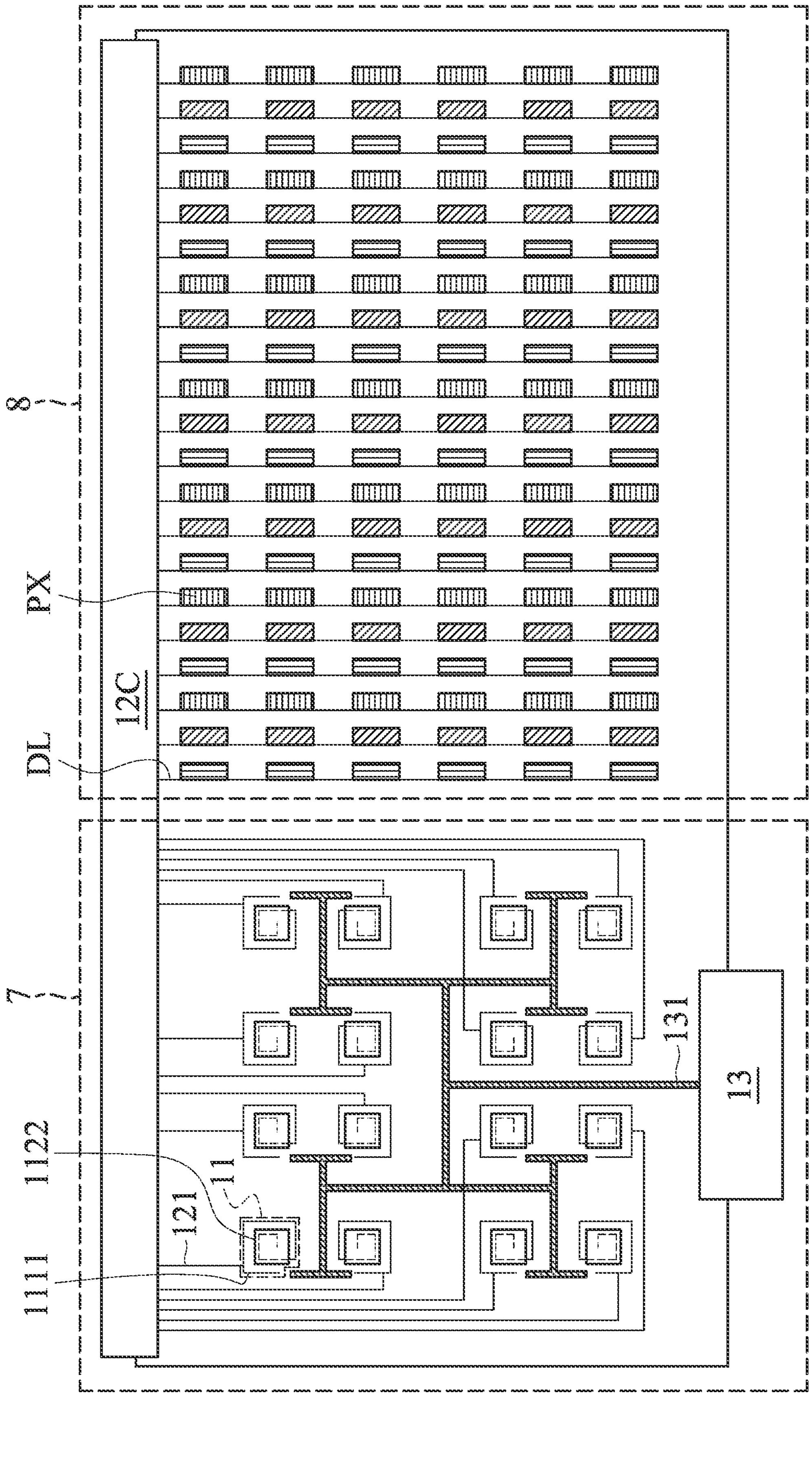
FIG. 14 is a top view of the architecture of an electronic device according to Embodiment 7 of the present disclosure.

Next, Embodiment 7 of the present disclosure will be described. FIG. 14 is a top view of the architecture of an electronic device according to Embodiment 7 of the present disclosure. The electronic device of Embodiment 7 is a combination of an antenna device 7 and a liquid crystal display panel 8. The antenna device 7 and the liquid crystal display panel 8 may share the same substrate(s), liquid crystal layer, and/or phase modulation circuit 12C, but it is not limited thereto. In other embodiments, the antenna device 7 and the liquid crystal display panel 8 may have different liquid crystal layers. For example, the thickness of the liquid crystal layer of the liquid crystal display panel 8 may be less than the thickness of the liquid crystal layer of the antenna device 7, but it is not limited thereto. The dielectric constant of the liquid crystal layer of the liquid crystal display panel 8 may be less than the dielectric constant of the liquid crystal layer of the antenna device 7, but it is not limited thereto. In Embodiment 7, the phase modulation circuit 12C can provide the phase modulation voltage $V_{AC1}$ to the antenna unit 11 of the antenna device 7 through the wire 121, and can provide data signals to the pixels PX of the liquid crystal display panel 8 through the data line DL. The phase modulation circuit 12C can be equivalent to a data driver for the liquid crystal display panel 8. The phase modulation circuit 12C can drive the liquid crystal display panel 8 by using, for example, the configuration of the phase modulation circuit 12B shown in FIG. 3B of the present disclosure. Although the antenna device 7 and the liquid crystal display panel 8 can share the phase modulation circuit 12C, the phase modulation circuit 12C can use the same or different frequencies to drive the antenna device 7 and the liquid crystal display panel 8, it is not limited in thereto.

The above disclosed features can be combined, modified, replaced, or reused with one or more disclosed embodiments in any suitable manner, and are not limited to specific embodiments.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:

a plurality of antenna units, wherein at least one of the plurality of antenna units comprises a first electrode, a phase modulation electrode, and a liquid crystal layer located between the first electrode and the phase modulation electrode; and a circuit for providing a first AC signal directly to the phase modulation electrode and providing a second AC signal indirectly to the phase modulation electrode.

2. The electronic device as claimed in claim 1, wherein the circuit comprises a first circuit unit for providing the first AC signal and a second circuit unit for providing the second AC signal.

3. The electronic device as claimed in claim 1, wherein the second AC signal is provided to the phase modulation electrode indirectly by electromagnetic coupling.

4. The electronic device as claimed in claim 1, wherein a frequency of the first AC signal is less than a frequency of the second AC signal.

5. The electronic device as claimed in claim 1, wherein the first AC signal has a positive voltage part and a negative voltage part with respect to a voltage level of the first electrode.

6. The electronic device as claimed in claim 5, wherein the first AC signal is a periodic wave, and a time-amplitude integral of the positive voltage part in a duty cycle is 80% to 125% of a time-amplitude integral of the negative voltage part in the duty cycle.

7. The electronic device as claimed in claim 1, wherein the at least one of the plurality of antenna units further comprises a capacitor coupled to a wire that transmits the first AC signal to the phase modulation electrode.

8. The electronic device as claimed in claim 1, wherein the at least one of the plurality of antenna units further comprises a shielding structure disposed on a position where the second AC signal is fed to the phase modulation electrode.

9. The electronic device as claimed in claim 1, wherein the at least one of the plurality of antenna units further comprises:

a spacer, wherein a height of the spacer is equal to a thickness of the liquid crystal layer; and another spacer, wherein a height of the another spacer is 50% to 95% of the thickness of the liquid crystal layer.

10. The electronic device as claimed in claim 1, wherein the at least one of the plurality of antenna units further comprises:

a spacer, disposed on a metal pad, wherein a total height of the spacer and the metal pad is equal to a thickness of the liquid crystal layer.

11. The electronic device as claimed in claim 1, further comprising:

a liquid crystal display panel, wherein the liquid crystal display panel and the plurality of antenna units share the liquid crystal layer.

12. The electronic device as claimed in claim 11, wherein the circuit comprises a first circuit for providing the first AC signal, and a second circuit for providing the second AC signal, wherein the first circuit is further for providing data signals to the liquid crystal display panel.

13. The electronic device as claimed in claim 11, wherein the second AC signal is provided to the phase modulation electrode indirectly by electromagnetic coupling.

14. The electronic device as claimed in claim 11, wherein a frequency of the first AC signal is less than a frequency of the second AC signal.

15. The electronic device as claimed in claim 11, wherein with respect to a voltage level of the first electrode, the first AC signal has a positive voltage part and a negative voltage part.

16. The electronic device as claimed in claim 15, wherein the first AC signal is a periodic wave, and a time-amplitude integral of the positive voltage part in a duty cycle is 80% to 125% of a time-amplitude integral of the negative voltage part in the duty cycle.

17. The electronic device as claimed in claim 11, wherein the at least one of the plurality of antenna units further comprises a capacitor coupled to a wire that transmits the first AC signal to the phase modulation electrode.

18. The electronic device as claimed in claim 11, wherein the at least one of the plurality of antenna units further comprises a shielding structure disposed above a position where the second AC signal is fed to the phase modulation electrode.

19. The electronic device as claimed in claim 11, wherein the at least one of the plurality of antenna units further comprises:

a spacer, wherein a height of the spacer is equal to a thickness of the liquid crystal layer; and another spacer, wherein a height of the another spacer is 50% to 95% of the thickness of the liquid crystal layer.

20. The electronic device as claimed in claim 11, wherein the at least one of the plurality of antenna units further comprises:

a spacer, disposed on a metal pad, wherein a total height of the spacer and the metal pad is equal to a thickness of the liquid crystal layer.

* * * * *